United States Patent
Besen et al.

(10) Patent No.: US 10,928,840 B2
(45) Date of Patent: Feb. 23, 2021

(54) SYSTEM FOR DISPENSATION OF COSMETIC COMPOUNDS

(71) Applicant: L'OREAL, Paris (FR)

(72) Inventors: Richard Besen, New York, NY (US); Nicholas Sinclair, New York, NY (US)

(73) Assignee: L'OREAL, Paris (FR)

( * ) Notice: Subject to any disclaimer, the term of this patent is extended or adjusted under 35 U.S.C. 154(b) by 227 days.

(21) Appl. No.: 16/005,079

(22) Filed: Jun. 11, 2018

(65) Prior Publication Data

US 2019/0377368 A1    Dec. 12, 2019

(51) Int. Cl.
*G05D 7/06*    (2006.01)
*A45D 34/00*   (2006.01)

(52) U.S. Cl.
CPC .......... *G05D 7/0617* (2013.01); *A45D 34/00* (2013.01)

(58) Field of Classification Search
CPC .............................. G05D 7/0617; A45D 34/00
See application file for complete search history.

(56) References Cited

U.S. PATENT DOCUMENTS

| | | |
|---|---|---|
| 2003/0019885 A1 | 1/2003 | Luehrsen et al. |
| 2006/0048841 A1 | 3/2006 | Luehrsen et al. |
| 2007/0095421 A1 | 5/2007 | Page |
| 2009/0223997 A1 | 9/2009 | Luehrsen et al. |
| 2011/0017773 A1 | 1/2011 | Luehrsen et al. |
| 2014/0142507 A1 | 5/2014 | Armes |
| 2018/0117265 A1 | 5/2018 | Armes |

FOREIGN PATENT DOCUMENTS

EP    3 222 308 A1    9/2017

OTHER PUBLICATIONS

International Search Report and Written Opinion dated Aug. 27, 2019, in PCT/US2019/036344, citing documents AA-AG and AO therein, 17 pages.

*Primary Examiner* — P. Macade Nichols
(74) *Attorney, Agent, or Firm* — Oblon, McClelland, Maier & Neustadt, L.L.P.

(57) ABSTRACT

The present disclosure relates to a dispenser assembly for accurate dispensation of cosmetic compounds for custom cosmetic formulations. The dispenser assembly includes a dispensing motor coupled to a dispensing plunger which, according to prescribed speed profiles, dispenses accurate volumes of compounds for custom cosmetic formulations.

10 Claims, 11 Drawing Sheets

FIG. 9

SYSTEM FOR DISPENSATION OF COSMETIC COMPOUNDS

BACKGROUND

Field of the Disclosure

The present disclosure relates to an apparatus and method for dispensation of a cosmetic compound.

Description of the Related Art

Accurate dispensation of fluids with a variety of properties is not easily performed within a single system. Further, modern skin care and dermatology are increasingly employing custom cosmetic formulations to meet the individual needs of customers. A convenient method of accurate and efficient production of customer-specific formulations is yet to be developed.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to an apparatus and method for dispensing a compound for a cosmetic formulation.

Specifically, the present disclosure relates to an apparatus for dispensing compounds for cosmetic formulations, comprising a dispensing motor, a plunger assembly having a plunger, and a dispensing assembly control device having a processing circuitry configured to receive electrical feedback regarding one of a plurality of characteristics of the apparatus, and modify a movement of the plunger based upon the electrical feedback regarding the one of the plurality of characteristics of the apparatus.

The present disclosure is further related to a non-transitory computer readable medium having stored thereon a program that when executed by the computer causes the computer to implement a method for moving a plunger of a plunger assembly in response to electrical feedback from an apparatus, the method comprising receiving, via processing circuitry, the electrical feedback regarding one of a plurality of characteristics of the apparatus, and modify, via the processing circuitry, a movement of the plunger based upon the electrical feedback regarding the one of the plurality of characteristics of the apparatus.

The present disclosure is further related to a method of dispensing, according to a speed profile, a compound for a cosmetic formulation, comprising receiving, via processing circuitry, electrical feedback regarding one of a plurality of characteristics of an apparatus, and modifying, via the processing circuitry, a movement of a plunger of a plunger assembly based upon the electrical feedback regarding the one of the plurality of characteristics of the apparatus.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Moreover, as referenced below, the terms "'home' optical sensor'" and "'home' photointerrupter flag" correspond to a "first optical sensor" and a "first photointerrupter flag", respectively. The terms "'contact' optical sensor" and "'contact' photointerrupter flag" correspond to a "second optical sensor" and a "second photointerrupter flag", respectively. Likewise, the terms "'bottom' optical sensor" and "'bottom' photointerrupter flag" correspond to a "third optical sensor" and a "third photointerrupter flag", respectively. Furthermore, the terms "home", "contact", and "bottom" refer to a "first position", "second position", and "third position", respectively.

Figure 1:
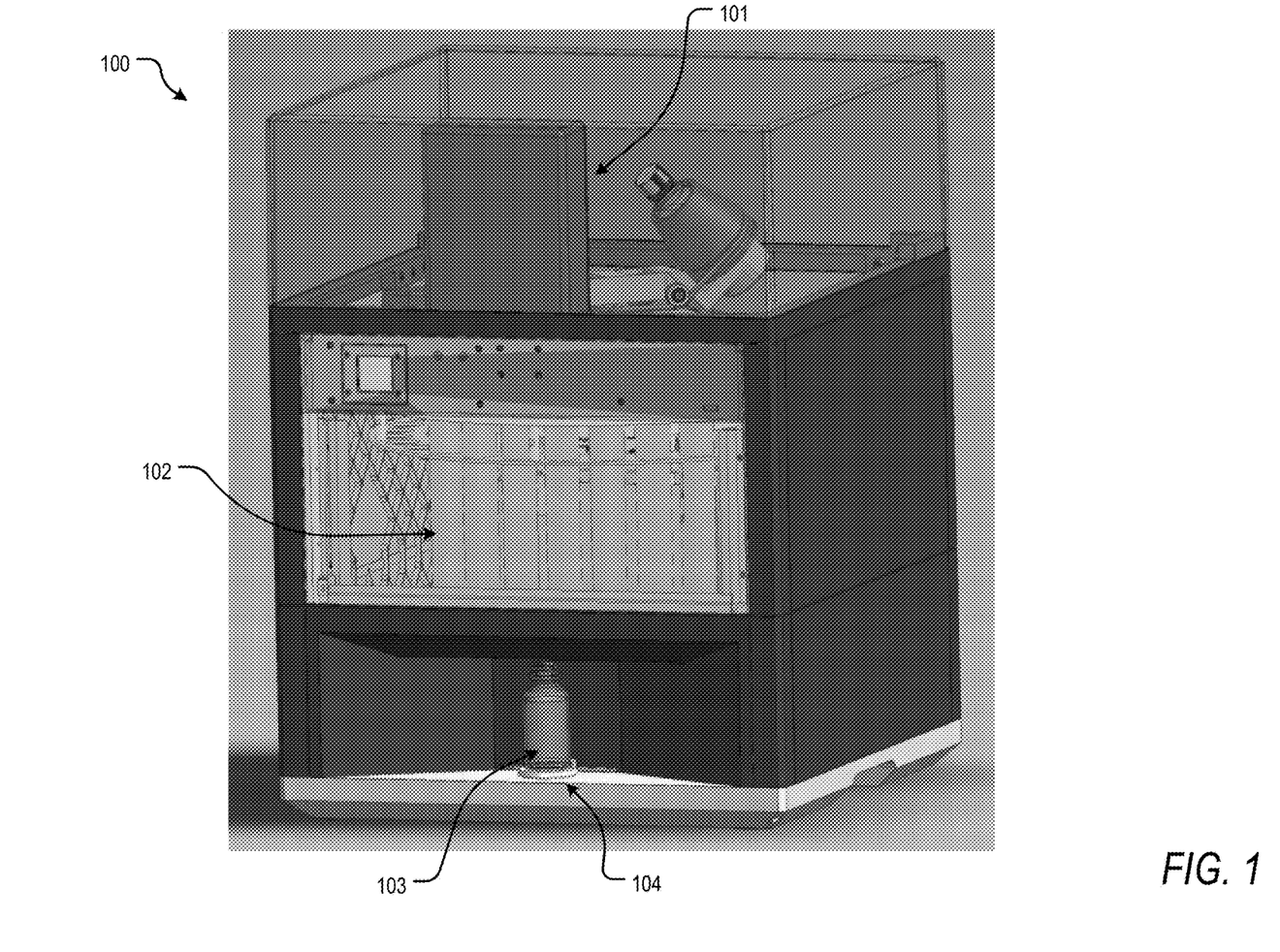
FIG. 1 is an illustration of a system for cosmetic mixing, according to an embodiment of the present disclosure.

Recently, demand has risen for cosmetic formulations that are mixed according to the needs of a user, customer, or client. Moreover, when considered in the context of dermatology, such a system introduces the possibility of creating on-demand custom cosmetic formulations that combine cosmetic bases with pharmacologically-active compounds. In this context, a system for cosmetic formulation 100 is depicted in FIG. 1. Integral to the operation of the system for cosmetic formulation 100 is a dispenser assembly 101. A component of the dispenser assembly 101, described further in FIG. 2, a plunger is indirectly-coupled to a motor that, via a processing circuitry and through a thread and screw mechanism, is translated such that the plunger comes into contact with a piston of a canister in a canister housing 102. After contact is made with the piston, the plunger continues to translate, causing the internal volume of the canister to decrease, thus dispensing the contents of the canister into a collection bottle 103. The collection bottle 103 rests on a weighting tray 104 that provides electrical feedback to the processing circuitry regarding the mass of the dispensed contents. The processing circuitry then modifies movement of the plunger of the dispenser assembly 101, accordingly, until a target mass of the cosmetic formulation is reached.

As alluded to, and according to an embodiment, the processing circuitry of the system for cosmetic formulation and the dispenser assembly, specifically, is responsible for controlling translation of the plunger. Moreover, a near-field communication (NFC) tag disposed on the canister within the canister housing 102 and an NFC reader disposed on the system for cosmetic formulation provide canister ID information to the processing circuitry, including identification information of the contents of each canister, production information, an expiration date, and the mass of the contents of each canister, allowing for execution of a specific speed profile of the dispenser assembly 101. The above-described speed profile of the dispenser assembly 100 is described in further detail in FIG. 4A and FIG. 4B.

According to an embodiment of the present disclosure, the weighting tray 104 may be a force sensor selected from a group including but not limited to a strain gauge load cell, a piezoelectric crystal, or a hydraulic or pneumatic load cell. In an embodiment, the force sensor is selected such that mass may be measured at a resolution appropriate for accurate dispensation of a variety of cosmetic compounds with disparate properties. In an example, this force resolution is 0.001 micrograms.

Figure 2:
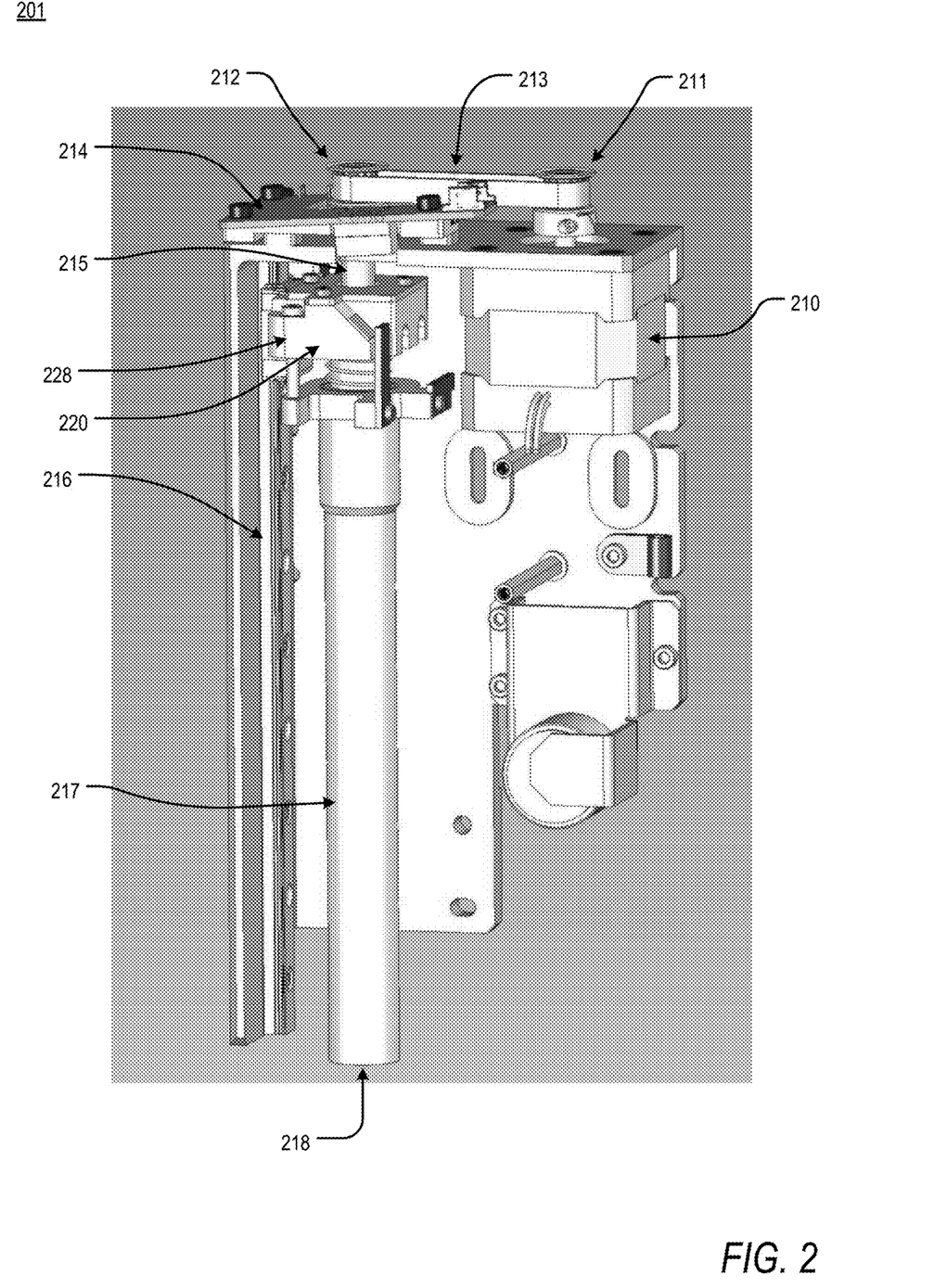
FIG. 2 is a perspective view of an illustration of a dispenser assembly, according to an embodiment of the present disclosure.

FIG. 2 is a perspective view of an illustration of the dispenser assembly of FIG. 1. According to an embodiment of the present disclosure, the dispenser assembly 201 comprises a dispensing motor 210 and a plunger assembly 218. The dispenser assembly 201 further comprises a driving spindle 211, a transfer belt 213, and a driven spindle 212 configured to transfer rotational energy from the dispensing motor 210 to the plunger assembly 218. The plunger assembly 218 comprises a lead screw 215 coupled to the driven spindle 212, a carriage assembly 220 coupled to a linear guide 216 and concentrically disposed along a longitudinal dimension of the lead screw 215, and a plunger 217. A top carriage 228 of the carriage assembly 220, coupled to the linear guide 216, is further coupled to the lead screw 215 via thread and screw mechanism, thus converting rotational energy from the lead screw 215 into translational energy via the linear guide 216. A printed circuit board (PCB) 214, according to an embodiment, is disposed on a housing of the dispenser assembly 201 and provides communication between a dispenser assembly control device and the plunger assembly 218. In an embodiment, the PCB 214 is in electrical communication with the dispenser assembly control device housed in the system for cosmetic formulation, described in FIG. 1.

According to an embodiment of the present disclosure, the dispensing motor 210 may be a motor selected from a group including but not limited to a brushed direct current (DC) motor, a brushless DC motor (including a stepper motor), an induction motor, or a linear motor (including voice coil motors). In an embodiment, the dispensing motor 210 may be directly coupled to the lead screw 215. The lead screw 215 may subsequently be coupled to the plunger 217 by a variety of means, including via direct coupling or indirect coupling, as would be understood by one of ordinary skill in the art. In an exemplary embodiment, the dispensing motor 210 is a linear, voice coil motor and is directly coupled to the plunger assembly 218, sans lead screw 215.

According to an embodiment, the dispensing motor 210, driving spindle 211, driven spindle 212, lead screw 225, and linear guide 216 are selected such that the plunger is linearly translated at a scale appropriate for accurate dispensation of a variety of cosmetic compounds with disparate properties. In an example, this linear resolution is 0.5 microns.

Figure 3A:
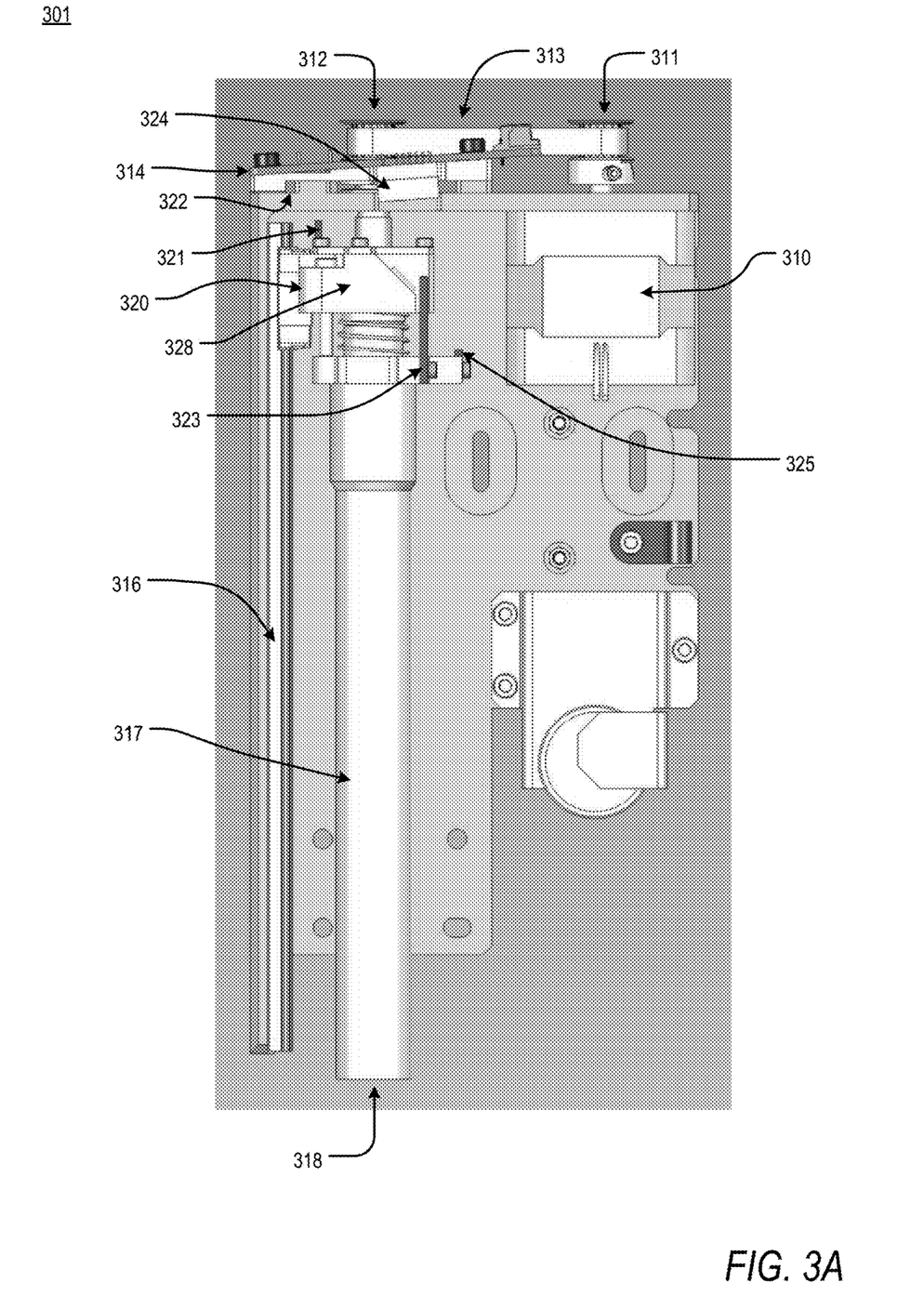
FIG. 3A is a frontal view of an illustration of a dispenser assembly, according to an embodiment of the present disclosure.

FIG. 3A is a frontal view of an illustration of the dispenser assembly of FIG. 1. According to an embodiment of the present disclosure, the dispenser assembly 301 comprises a dispensing motor 310 and a plunger assembly 318. The dispenser assembly 301 further comprises a driving spindle 311, a transfer belt 313, and a driven spindle 312 configured to transfer rotational energy from the dispensing motor 310 to the plunger assembly 318. The plunger assembly 318 comprises a lead screw 315 coupled to the driven spindle 312, a carriage assembly 320 coupled to a linear guide 316 and concentrically disposed along a longitudinal dimension of the lead screw 315, and a plunger 317. A top carriage 328 of the carriage assembly 320, coupled to the linear guide 316, is further coupled to the lead screw 315 via thread and screw mechanism, thus converting rotational energy from the lead screw 315 into translational energy via the linear guide 316. A PCB 314, according to an embodiment, is disposed on a housing of the dispenser assembly 301 and provides communication between a dispenser assembly control device and the plunger assembly 318. In an embodiment, the PCB 314 is in electrical communication with the dispenser assembly control device housed in the system for cosmetic formulation, described in FIG. 1.

The dispenser assembly 301 further comprises, disposed on the PCB 314, a 'home' optical sensor 322. In an exemplary embodiment, the 'home' optical sensor 322 is an optical-type photosensor wherein a light emitting element on a first interior surface of a substantially U-shaped device is optically aligned with a light receiving element on a second interior surface of the substantially U-shaped device such that a light emitted from the light emitting element is received by the light receiving element, as would be understood by one of ordinary skill in the art. In an example, the 'home' optical sensor 322 is disposed on the PCB 314 such that, upon retraction of the plunger 317, a 'home' photointerrupter flag 321 crosses the path of the light passing between the light emitting element and the light receiving element of the 'home' optical sensor 322, resulting in a blockage of light. Disruption of the light path of the 'home' optical sensor 322 is an indication of the presence of the carriage assembly 320 in a 'home', or zero, position.

According to an embodiment, the PCB 314 of the dispenser assembly 301 further comprises a 'contact' optical sensor 324. In an exemplary embodiment, the 'contact' optical sensor 324 is a reflector-type photosensor wherein a light emitting element and a light receiving element are positioned adjacently on the same surface of a device, such that light emitted from the light emitting element would be received by the light receiving element only when reflected by a target object, as would be understood by one of ordinary skill in the art. In an example, the 'contact' optical sensor 324 is disposed on the PCB 314 such that, upon extension of the plunger 317 and contact with a piston of a canister, a 'contact' photointerrupter flag 323 crosses the path of a light emitted from the light emitting element of the 'contact' optical sensor 324, reflecting it back toward the 'contact' optical sensor 324 where it is received by the light receiving element. Reception, of reflected light by the 'contact' optical sensor 324 is an indication of the presence of the carriage assembly 320 in a 'contact' position.

According to an embodiment, the plunger assembly 318 further comprises a 'bottom' photointerrupter flag 325 disposed on the carriage assembly 320. In an exemplary embodiment, a 'bottom' optical sensor (not shown), disposed on the chassis of the system for cosmetic formulation, described in FIG. 1, is a reflector-type photosensor wherein a light emitting element and a light receiving element are positioned adjacently on the same surface of the device, such that light emitted from the light emitting element would be received by the light receiving element only when reflected by a target object, as would be understood by one of ordinary skill in the art. In an example, the 'bottom' optical sensor is disposed on the chassis such that, upon extension of the plunger 317 to the bottom of the canister housing, the 'bottom' photointerrupter flag 325 crosses the path of a light emitted from the light emitting element of the 'bottom' optical sensor, reflecting it back towards the 'bottom' optical sensor where it is received by the light receiving element. Reception of reflected light by the 'bottom' optical sensor is an indication that the plunger 317 has translated to a limit, or maximum safe distance.

In an example of the implementation of the 'bottom' sensor, the mass of the contents of a canister to be dispensed are less than the target mass of the contents to be dispensed. As a result, it is feasible that the plunger 317 may translate into the canister housing and make contact with the 'bottom' of the canister housing prior to reaching the target mass to be dispensed, thus damaging the dispenser assembly 301 and rendering the system for cosmetic formulation, as described in FIG. 1, inoperable. The 'bottom' sensor is described in further detail in FIG. 7.

According to an exemplary embodiment, the 'home' optical sensor 322, the 'contact' optical sensor 324, and the 'bottom' optical sensor are selected from a group including but not limited to optical-type photosensors and reflector-type photosensors, as would be understood by one of ordinary skill in the art. Moreover, in an example, the light source of the 'home' optical sensor 322, the 'contact' optical sensor 324, and the 'bottom' optical sensor is selected from a group including but not limited to infrared light-emitting diodes, as would be understood by one of ordinary skill in the art.

Figure 3B:
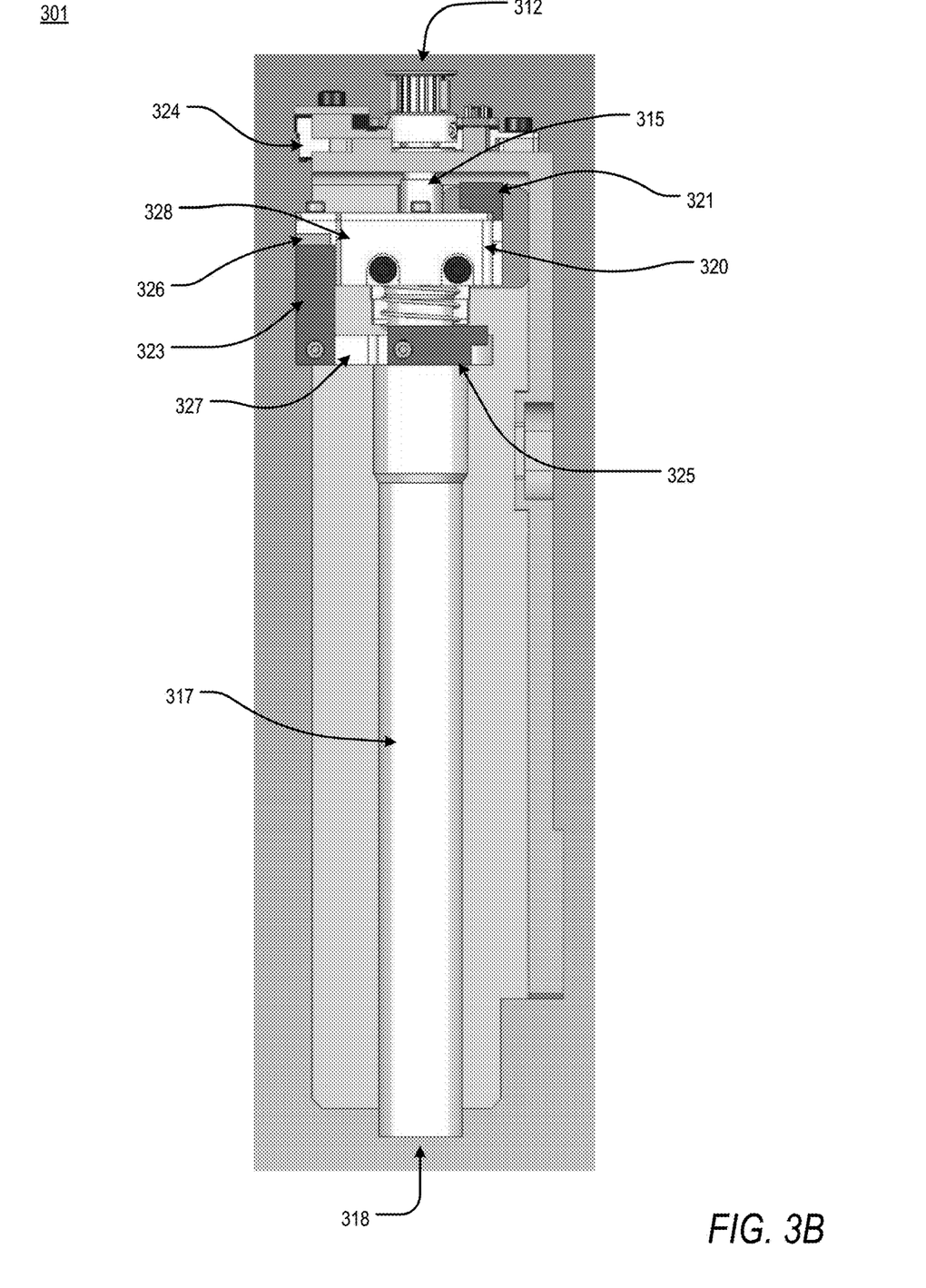
FIG. 3B is a lateral view of an illustration of a dispenser assembly, according to an embodiment of the present disclosure.

FIG. 3B is a lateral view of an illustration of the dispenser assembly of FIG. 1. Moreover, FIG. 3B is a cross-section of a lateral view, with the dispensing motor removed in order to expose the photointerrupter flags of the carriage assembly 320 for viewing.

According to an embodiment of the present disclosure, the dispenser assembly 301 comprises a dispensing motor and a plunger assembly 318. The dispenser assembly 301 further comprises a driving spindle, a transfer belt, and a driven spindle 312 configured to transfer rotational energy from the dispensing motor to the plunger assembly 318. The plunger assembly 318 comprises a lead screw 315 coupled to the driven spindle 312, a carriage assembly 320, comprising a top carriage 328 and a bottom carriage 327, coupled to a linear guide and concentrically disposed along a longitudinal dimension of the lead screw, and a plunger 317. The top carriage 328 of the carriage assembly 320, coupled to the linear guide, is further coupled to the lead screw 315 via thread and screw mechanism, thus converting rotational energy from the lead screw 315 into translational energy via the linear guide. A PCB, according to an embodiment, is disposed on a housing of the dispenser assembly 301 and provides communication between a dispenser assembly control device and the plunger assembly 318. In an embodiment, the PCB is in electrical communication with the dispenser assembly control device housed in the system for cosmetic formulation, described in FIG. 1.

The dispenser assembly 301 further comprises, disposed on the PCB, a 'home' optical sensor. In an exemplary embodiment, the 'home' optical sensor is an optical-type photosensor, as described above. In an example, the 'home' optical sensor is disposed on the PCB such that, upon retraction of the plunger 317, a 'home' photointerrupter flag 321 crosses a path of a light passing between a light emitting element and a light receiving element of the 'home' optical sensor, resulting in a blockage of light. Disruption of the light path of the 'home' optical sensor by the 'home' photointerrupter flag 321 is an indication of the presence of the carriage assembly 320 in a 'home', or zero, position.

According to an exemplary embodiment, the 'home' photointerrupter flag 321 is disposed on a surface of the top carriage 328 of the carriage assembly 320, arranged such that a dimension of the 'home' interrupter flag 321 is parallel to a longitudinal dimension of the lead screw 315. Further, the 'home' interrupter flag 321 is arranged such that a portion of the 'home' interrupter flag 321 disrupts the light of the 'home' optical sensor when the plunger assembly 318 is in a 'home' position.

According to an embodiment, the PCB of the dispenser assembly 301 further comprises a 'contact' optical sensor 324. In an exemplary embodiment, the 'contact' optical sensor 324 is a reflector-type photosensor, as described above. In an example, the 'contact' optical sensor 324 is disposed on the PCB 314 such that, upon extension of the plunger 317 and contact with a piston of a canister, a 'contact' photointerrupter flag 323 of the bottom carriage 327 of the carriage assembly 320 crosses a path of a light emitted from a light emitting element of the 'contact' optical sensor 324, reflecting it back towards the 'contact' optical sensor 324 where it is received by a light receiving element. Reception of reflected light by the 'contact' optical sensor 324 is an indication of the presence of the carriage assembly 320 in a 'contact' position.

According to an exemplary embodiment, the 'contact' photointerrupter flag 323 is disposed on a surface of the bottom carriage 327 of the carriage assembly 320, arranged such that a dimension of the 'contact' interrupter flag 323 is parallel to a longitudinal dimension of the lead screw 315. Further, the 'contact' interrupter flag 323 is arranged such that a portion of the 'contact' interrupter flag 323 crosses a reflecting plane of a reflective surface 326, disrupting the light of the 'contact' optical sensor when the plunger assembly 318 is in a 'contact' position.

The 'contact' sensor, briefly discussed above, will be described in detail in FIG. 5A, FIG. 5B, and FIG. 5C.

According to an embodiment, the plunger assembly 318 further comprises a 'bottom' photointerrupter flag 325 disposed on the bottom carriage 327 of the carriage assembly 320. In an exemplary embodiment, a 'bottom' optical sensor (not shown), disposed on the chassis of the system for cosmetic formulation, described in FIG. 1, is a reflector-type photosensor, as described above. In an example, the 'bottom' optical sensor is disposed on the chassis such that, upon extension of the plunger 317 to the bottom of a canister housing, the 'bottom' photointerrupter flag 325 crosses the path of a light emitted from a light emitting element of the 'bottom' optical sensor, reflecting it back towards the 'bottom' optical sensor where it is received by a light receiving element. Reception of reflected light by the 'bottom' optical sensor is an indication that the plunger 317 has translated to a limit, or maximum safe travel distance. In an example, the contents of the canister to be dispensed are less than the target mass of the contents to be dispensed. As a result, the plunger 317 translates into the canister housing and makes contact with the 'bottom' of the canister housing prior to reaching the target mass to be dispensed, thus feasibly damaging the dispenser assembly 301 and rendering the system for cosmetic formulation, as described in FIG. 1, inoperable.

According to an exemplary embodiment, the 'bottom' photointerrupter flag 325 is disposed on a surface of the bottom carriage 327 of the carriage assembly 320, arranged such that a dimension of the 'bottom' interrupter flag 325 is perpendicular to a longitudinal dimension of the lead screw 315. Further, the 'bottom' interrupter flag 325 is arranged such that a portion of the 'bottom' interrupter flag 325 disrupts the light of the 'bottom' optical sensor when the plunger assembly 318 is in a 'bottom' position.

According to an exemplary embodiment, the 'home' optical sensor 322, the 'contact' optical sensor 324, and the 'bottom' optical sensor are selected from a group including but not limited to optical-type photosensors and reflector-type photosensors, as would be understood by one of ordinary skill in the art. Moreover, in an example, the light source of the 'home' optical sensor 322, the 'contact' optical sensor 324, and the 'bottom' optical sensor is selected from a group including but not limited to infrared light-emitting diodes, as would be understood by one of ordinary skill in the art.

The above-describe optical sensors and photointerrupter flags are integral to the function of the dispenser assembly control device. Owing to the varying properties of each cosmetic base and pharmacologic compound, the speed profile of the plunger must be varied for each canister to ensure proper dispensation of contents, making accurate positional control of the plunger imperative.

Figure 4A:
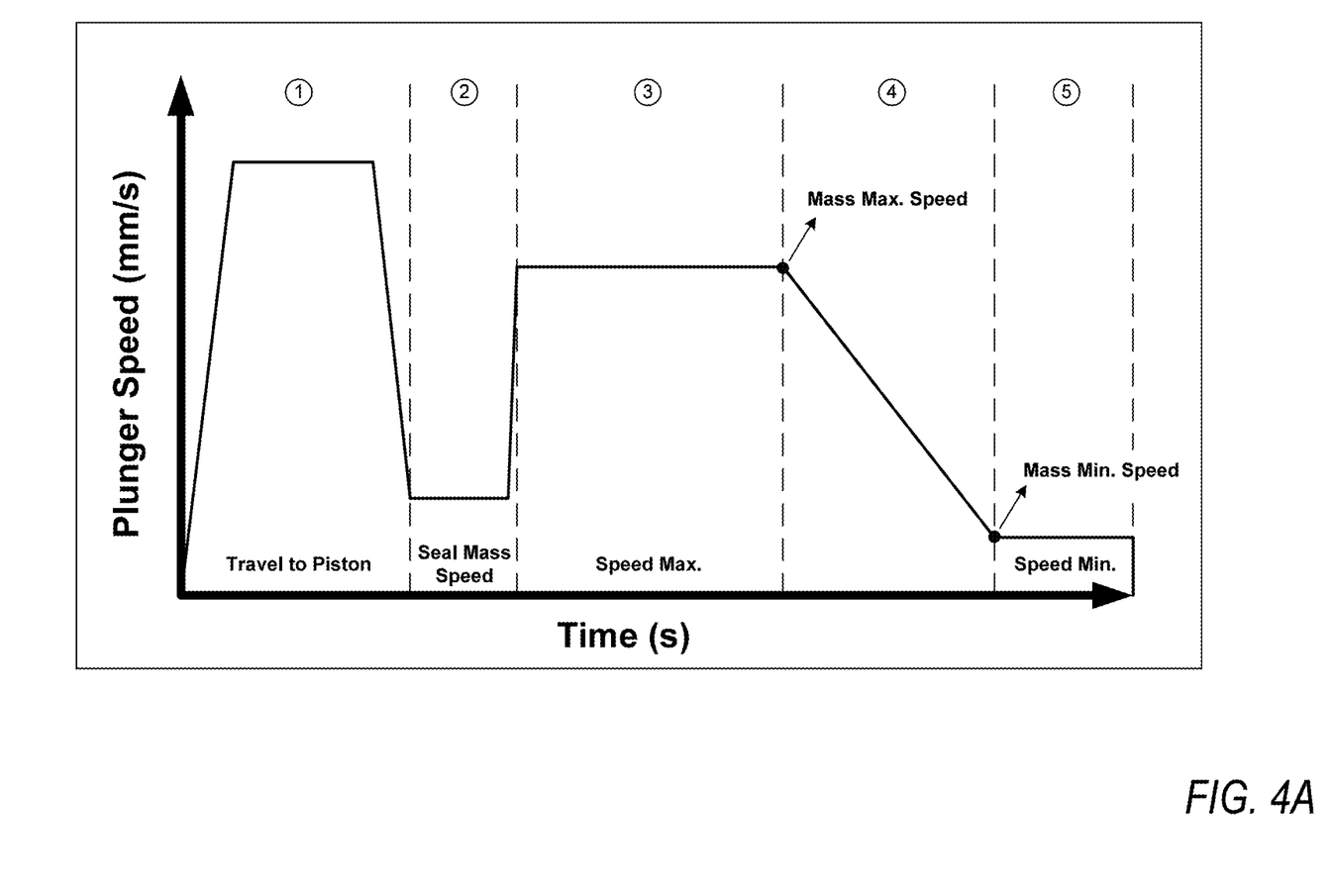
FIG. 4A is a graphical representation of an exemplary speed profile, according to an embodiment of the present disclosure.

FIG. 4A is a graphical representation of an exemplary speed profile of a cosmetic compound. The terms "phase one", "phase two", "phase three", "phase four", and "phase five" correspond to a "first speed", "second speed", "third speed", "fourth speed", and "fifth speed", respectively. Moreover, the term "second speed" refers to a "seal mass speed", the term "third speed" refers to a "speed max", and the "fifth speed" refers to a "speed min", or "fill speed".

According to an embodiment of the present disclosure, the exemplary speed profile of the cosmetic compound is representative of a cosmetic base with pre-determined mechanical properties. Following confirmation of the contents of the container via NFC and canister ID, the dispenser assembly control device, via the dispensing motor and plunger assembly, begins translation of the plunger according to a pre-determined speed profile. In phase one (1), the plunger is translated at a rapid travel speed, or first speed, independent of the contents of a canister, until contact is made with a piston of the canister. Upon making contact with the piston, the travel speed is decreased to a 'seal mass speed', or second speed, in phase two (2). Decreasing the travel speed ensures that the rapid travel speed used to reach the piston of the canister does not lead to traumatic rupture of the seal of the canister, causing the contents to uncontrollably erupt into a collection bottle positioned below the canister. The plunger then continues travel at the 'seal mass speed' (2) until a weight, or first target mass, is registered in the collection bottle positioned below the canister. Next, in phase three (3), the plunger travel speed is increased to a 'speed max', or third speed, the maximum allowable travel speed at which the contents of the canister may be dispensed. The 'speed max' is dependent upon the unique properties of each compound. Per the desired formulation, a pre-determined final target mass of contents of the canister is to be dispensed. In order to accurately, within tolerance, dispense the final target mass of contents, the plunger travel speed decreases as the target mass is approached. At a second target mass, or 'mass max speed', the travel speed of the plunger is slowly decreased in phase four (4), at a fourth speed, until a third target mass, or 'mass min speed', is achieved. Upon arriving at the 'mass min speed', the plunger travel speed is maintained at a fifth speed referred to as 'speed min', or 'fill speed', in phase five (5), until the final target mass is reached in the collection bottle.

In an embodiment, the fourth speed is a variable speed, wherein the variable speed is a derivative of a rate of acceleration, positive or negative, at a given time point between the second target mass and the third target mass. In an embodiment, the fourth speed at a given time is determined according to a pre-determined deceleration rate, wherein the pre-determined deceleration rate is based upon the contents of a canister. In another embodiment, the fourth speed at a given time is determined according to a pre-determined deceleration time that is specific to each canister. In an example, the pre-determined deceleration time is 10 seconds. A 'speed max', or the speed of the plunger at the end of the third phase, is 3.5 mm/s, and the 'speed min', or the speed of the plunger at the beginning of the fifth phase, is 0.04 mm/s. Therefore, if 10 seconds is prescribed as the time to reach phase five from phase three, the rate of deceleration, with the variable speed calculated therefrom, is $-0.346$ mm/s$^2$. While the mass of the contents in the collection bottle is a control parameter of the above-described graphical representation of the exemplary embodiment of the present disclosure, it can be appreciated that the above-described process may be controlled via a variety of approaches including but not limited to force and/or displacement. For example, through an understanding of the resolution of the dispensing motor, the lead screw, the linear guide, and the volumetric dimensions of each canister, among others, dispensation of the contents of each canister can be easily accomplished via a displacement-controlled approach, as would be understood by one of ordinary skill in the art, and as described in detail in FIG. 8.

Figure 4B:
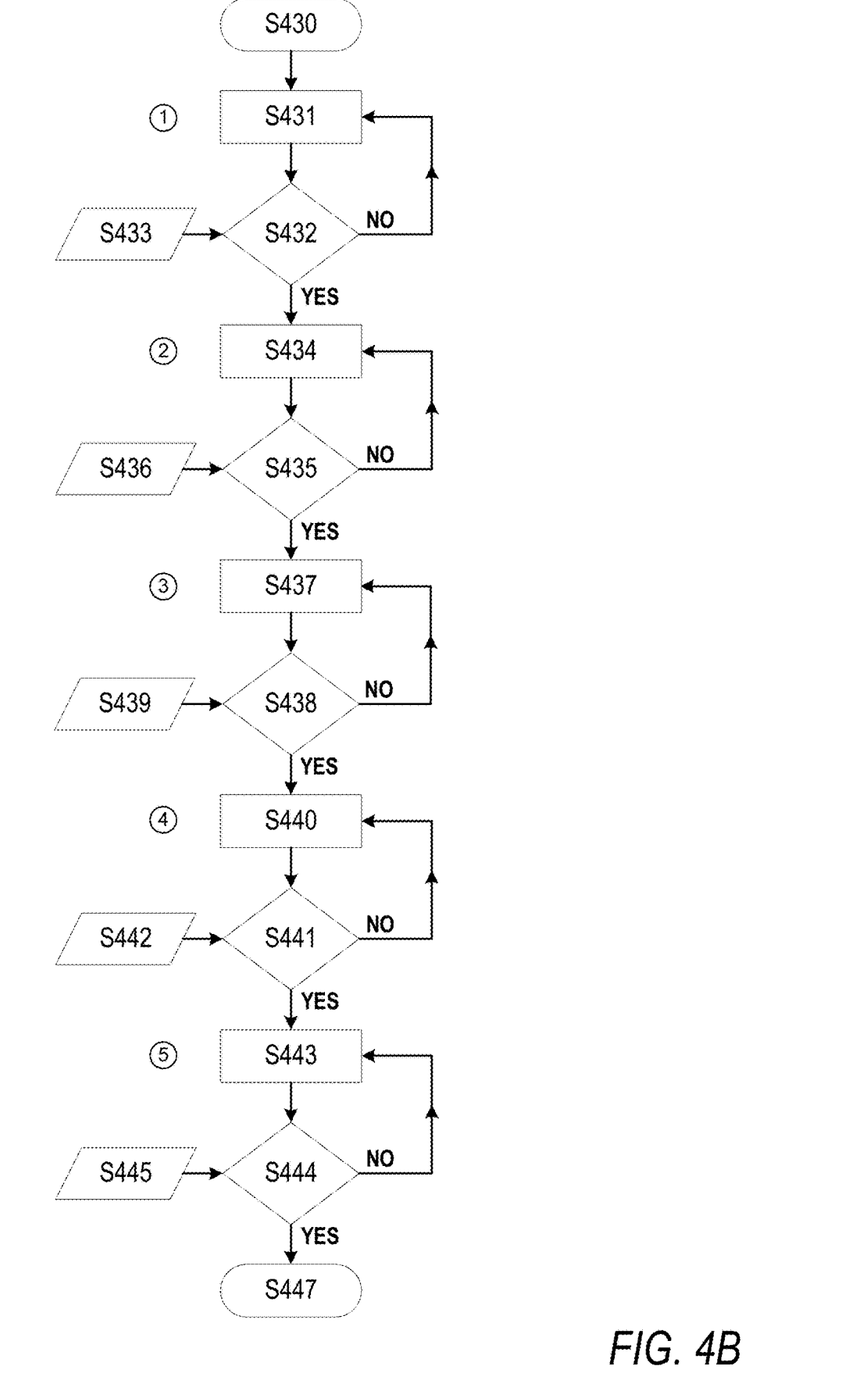
FIG. 4B is a flowchart describing an exemplary speed profile, according to an embodiment of the present disclosure.

FIG. 4B is a flowchart describing the exemplary speed profile of the cosmetic compound in FIG. 4A. As described, the exemplary speed profile of the cosmetic compound is representative of a cosmetic base with associated mechanical properties. First, the position of the canister and the canister ID are confirmed S430. Accordingly, canister ID information is received via NFC and the position of the canister in the 'home' position is confirmed by colocation of the 'home' optical sensor and the 'home' photointerrupter flag. Once the corresponding speed profile of the canister and final target mass is acquired, in phase one, the plunger begins travel toward the canister at a maximum travel speed 5431. During travel, the 'contact' optical sensor is continuously queried S432 to determine when 'contact' with the piston of the canister has occurred, in order to prevent traumatic rupture of the seal of the canister. If determined, upon receipt of data from the 'contact' optical sensor S433, that 'contact' has been made with the piston, plunger travel is halted and phase two of the speed profile begins. Otherwise, plunger travel continues until 'contact' has been determined. In phase two, the plunger travels at 'seal mass speed' S434, thus overcoming the valve and beginning dispensation of the contents of the canister into the collection bottle. During plunger travel at 'seal mass speed', a continuous evaluation of the mass of the collection bottle is performed S435. Upon registering a first target mass in the collection bottle, as determined from data received from the weighting tray S436, the speed profile is moved to phase three. Alternatively, the plunger continues to travel at 'seal mass speed' until it is determined, via the weighting tray, that the first target mass been collected and, thus, the seal is ruptured. In an embodiment, the first target mass is a positive change in mass within the resolution of the weighting tray. In phase three, the plunger travels at 'speed max' until a second target mass is reached S437. 'Speed max' is defined as the maximum allowable speed at which the contents of an individual container can be dispensed. For example, a highly viscous compound, that flows slowly, may be more controllable than a less viscous compound, that flows readily, and thus a higher, yet still controllable, 'speed max' may be allowable. During plunger travel at 'speed max', the mass of the collection bottle is continuously evaluated S438, with data queried from the weighting tray S439, to determine when the second target mass has been reached. Once the second target mass has been achieved, and in order to precisely arrive at the accurate final target mass, phase four of the speed profile is begun, wherein the travel speed of the plunger is reduced linearly S440 until a third target mass is reached. During phase four, the mass of the collection bottle is continuously evaluated S441 to determine when the third target mass is reached, querying data from the weighting tray S442, accordingly. When the third target mass is achieved, and in order to accurately arrive at the final target mass, the plunger travel speed is reduced to a 'speed min' S443 in phase five. In an embodiment, the 'speed min', or 'fill speed', of phase five is a drop-by-drop speed, a resolution limited only by the internal cohesive forces of each droplet of the compound. As the mass of the collection bottle approaches the final target mass, the mass is continuously evaluated S444, via data from the weighting tray S445, to determine when the final target mass is reached. Once it is determined that the mass within the collection bottle is within tolerance of the final target mass, the plunger is retracted S447 at a retraction speed, or maximum travel speed, until the plunger assembly is determined to be in the 'home' position, according to colocation of the 'home' optical sensor and 'home' photointerrupter flag.

Figure 5A:
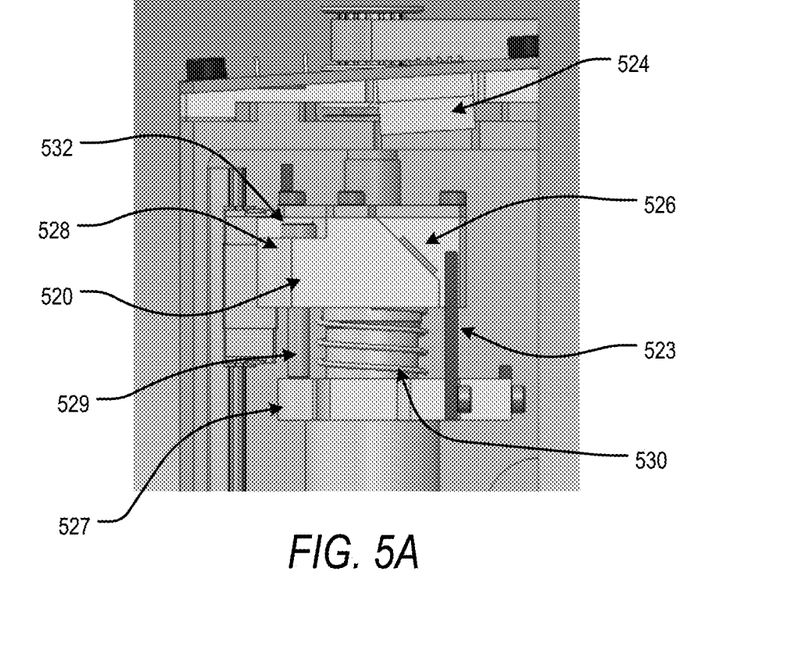
FIG. 5A is a frontal view of an illustration of a carriage assembly of a dispenser assembly, according to an exemplary embodiment of the present disclosure.

The transition from phase one to phase two of each speed profile requires the determination that contact has been made between the plunger and the piston of the canister. In an embodiment, and so as to avoid undue force on the piston and uncontrollable eruption of the contents of the canister, FIG. 5A is a frontal view of an illustration of the 'contact' sensor of the present disclosure. In FIG. 5A, as described previously, a 'contact' optical sensor 524 is disposed on a surface of a PCB. A 'contact' photointerrupter flag 523 is disposed on a bottom carriage 527 of a carriage assembly 520. A reflective surface 526 is disposed on a surface of a top carriage 528 of the carriage assembly 520. According to an embodiment, the carriage assembly 520 further comprises a dowel 529. The dowel 529 is coupled to the bottom carriage 527 of the carriage assembly 520 but can freely translate through the body of the top carriage 528 of the carriage assembly 520 via a clearance fit. A dowel cap 532, with a diameter larger than the diameter of the clearance fit, is disposed on an end surface of the dowel 529 and creates a maximum limit of translation of the bottom carriage 527 of the carriage assembly 520. When in the 'home' position, a spring 530 maintains an inter-carriage distance approximately equal to the maximum limit of translation of the bottom carriage 527 of the carriage assembly 520. The spring 530, 'contact' optical sensor 524, and 'contact' photointerrupter flag 523 together create the 'contact' sensor employed in the present disclosure, as described further in FIG. 5B and FIG. 5C.

Figure 5B:
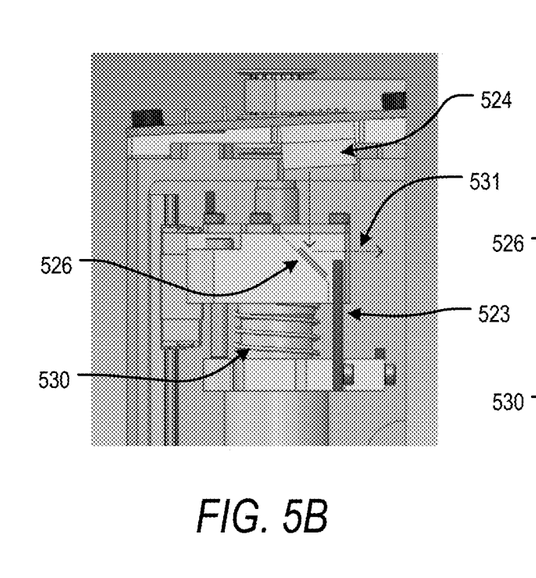
FIG. 5B is a frontal view of an illustration of an uncompressed carriage assembly of a dispenser assembly, according to an exemplary embodiment of the present disclosure.

FIG. 5B is a frontal view of an illustration of the 'contact' sensor of the present disclosure in an uncompressed, or non-contact, state. In an example, during phase one of a prescribed speed profile, prior to contact with the piston of the canister, the carriage assembly travels with the plunger, maintaining a pre-determined inter-carriage distance under zero applied load. Concurrently, as described in FIG. 4B, the 'contact' optical sensor 524 continuously emits light 531 that is reflected from a reflection surface 526. In the non-contact state, the reflected light 531 is lost to the dispenser assembly as the 'contact' photointerrupter flag 523, attached to the bottom carriage of the carriage assembly and separated from the reflection surface 526 by a spring 530, is not in the path of the light 531.

Figure 5C:
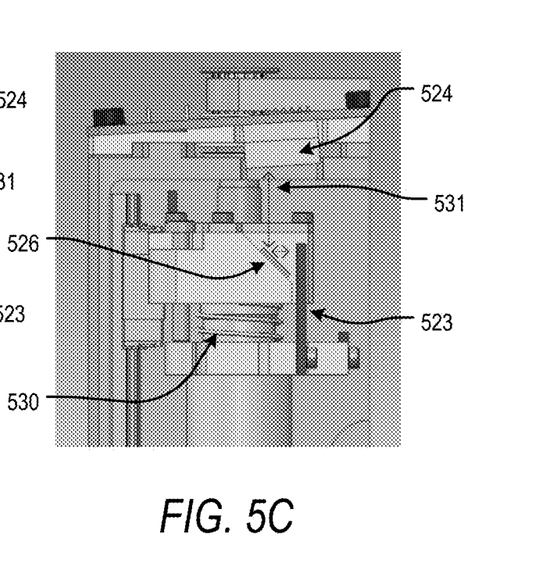
FIG. 5C is a frontal view of an illustration of a compressed carriage assembly of a dispenser assembly, according to an exemplary embodiment of the present disclosure.

As described in FIG. 5C, however, in a compressed, or contact, state. For illustrative purposes, only the 'contact' photointerrupter flag 523 and associated carriage components has been moved. In the compressed state, the 'contact' photointerrupter flag 523 crosses into the path of light 531 emitted from the 'contact' optical sensor 524. As a result, the reflected light 531 is returned to the receiver of the 'contact' optical sensor 524 and a determination of 'contact' with the piston of the canister is made. As mentioned previously, this determination is critical in preventing traumatic rupture of the canister.

In an example, as initial contact is made with the piston, reactionary forces of the piston are applied to the plunger, and the bottom carriage of the carriage assembly attached thereto, in the direction opposite the direction of movement of the plunger assembly, generally. These reactionary forces compress the spring 530, bringing the bottom carriage into close proximity with the top carriage, thus reducing the inter-carriage distance. As a result, the 'contact' photointerrupter flag 523 is brought into the path of light 531 emitted from the 'contact' optical sensor 524. Disrupting the emitted light of the 'contact' optical sensor 524, and reflecting it back to the light receiving element of the 'contact' optical sensor, generates a signal to the dispenser assembly control device that contact has been made and a subsequent phase of the speed profile should be initiated.

According to an embodiment, the spring 530 is selected from a group of spring-like elements including but not limited to precision springs, having suitable structural and mechanical properties. Generally, the inner diameter of the spring 530 and the length of the spring 530 are determined relative to the dimensions of the lead screw, the carriage assembly, and the initial inter-carriage distance. The spring constant of the selected precision spring is determined based upon the force required to rupture the seal of the canister and in accordance with Hooke's Law. In other words, as the displacement of the bottom carriage, relative to the top carriage, reaches the amount necessary to block, via the 'contact' interrupter flag 523, the light 531 emitted from the 'contact' optical sensor 524 and reflect it back to the light receiving element of the 'contact' optical sensor 524, the required force applied to the spring must be less than the force required to rupture the seal of the canister.

Figure 6:
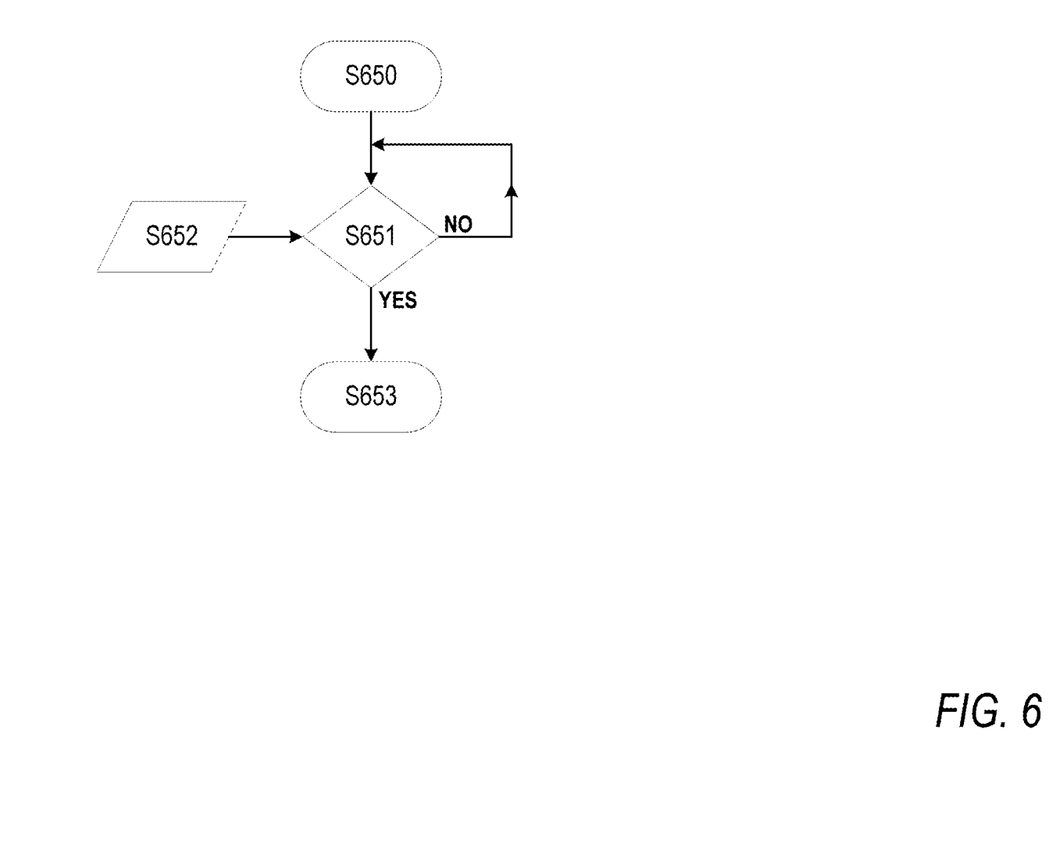
FIG. 6 is a flowchart describing a digital overload control of a dispenser assembly, according to an embodiment of the present disclosure.

In addition to the electro-optical switches and mechanical elements that provide control inputs to the dispenser assembly control device, digital controls provide further support and protection for the dispenser assembly during operation. FIG. 6 is a flowchart describing a digital overload control of the dispenser assembly. According to an embodiment of the present disclosure, when the plunger has made contact with an unintended object (e.g., inner wall of the canister housing, physical impediment) and is stalled within a prescribed speed profile, the dispenser assembly control device is able to halt progression of the speed profile and return the plunger to the 'home' position. In an embodiment, the plunger is returned to the 'home' position at a retraction speed. In an example, the retraction speed is equivalent to the first speed. The determination to halt the progression of the speed profile is based upon a measurement of the current amperage, above a normal, or expected, amperage required to continue movement of the plunger. In an example, a plunger is in motion during a phase of a prescribed speed profile S650. Concurrent with this motion, a continuous evaluation of the dispensing motor is performed S651, with current amperage data being received S652 from the dispensing motor in real-time. Based upon the evaluation of the current amperage being applied to the dispensing motor, relative to predicted amperage required to produce the same motion, the dispenser assembly control device can halt the speed profile and return the plunger to the 'home' position S653. If the evaluation S651 is performed and it is determined that the applied amperage is substantially equivalent to the normally applied amperage, plunger motion is allowed to continue.

Figure 7:
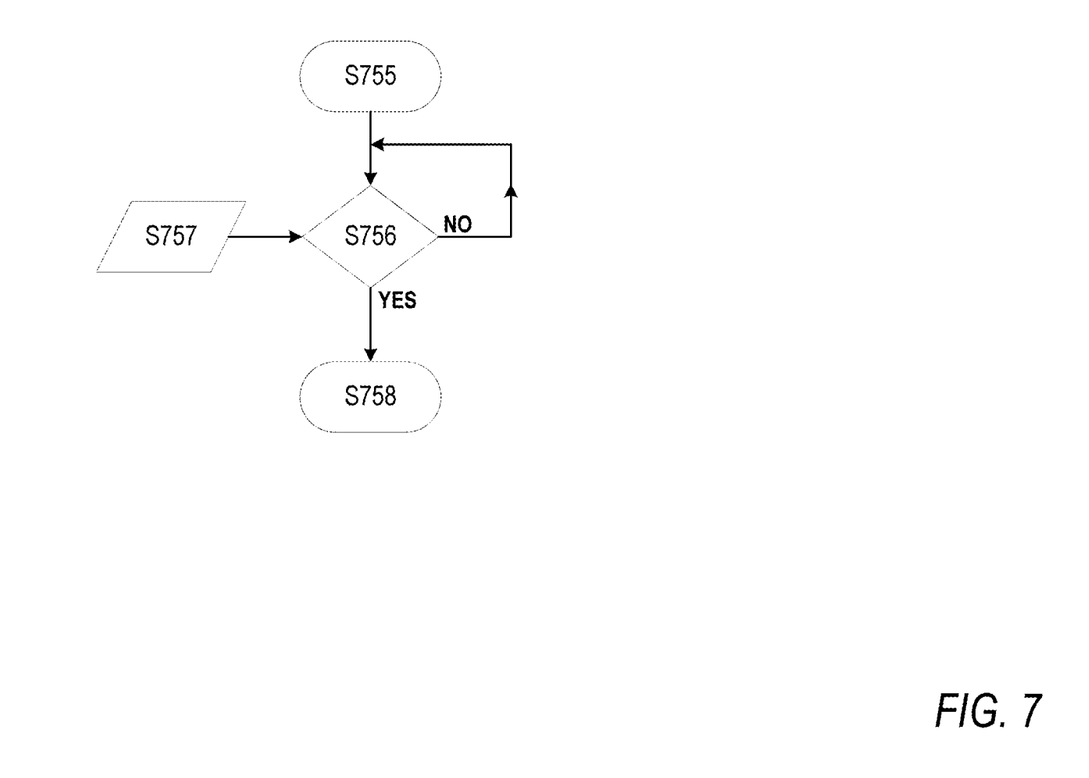
FIG. 7 is a flowchart describing a bottom sensor of a dispenser assembly, according to an embodiment of the present disclosure.

Further to the digital protective mechanism above, FIG. 7 is a flowchart describing the electro-mechanical, protective 'bottom' sensor of the dispenser assembly. According to an embodiment of the present disclosure, when the plunger has made contact with the bottom of the canister housing and subsequent motion might damage the plunger assembly, a 'bottom' photointerrupter flag of the carriage assembly crosses into the light path of a 'bottom' optical sensor. Disruption of the emitted light path, and subsequent reflection back to the receiver of the 'bottom' optical sensor, halts movement of the plunger, protecting the plunger assembly from physical damage. In an example, the plunger is in movement in a phase of a prescribed speed profile S755. During motion, an evaluation of the position of the plunger relative to the canister housing is performed S756 with data collected from a chassis-based 'bottom' optical sensor S757. When light emitted from the 'bottom' optical sensor is reflected back to the receiver of the 'bottom' optical sensor, via the 'bottom' photointerrupter flag of the carriage assembly, indicating that the plunger has reached the bottom of the canister housing, a signal is transmitted to the dispenser assembly control device, halting progression of the plunger and causing the plunger to be retracted, at the retraction speed, to the 'home' position. If the evaluation S756 is performed and it is determined that the plunger is not at the bottom of the canister housing, according to the 'bottom' optical sensor, plunger motion is allowed to continue.

Figure 8:
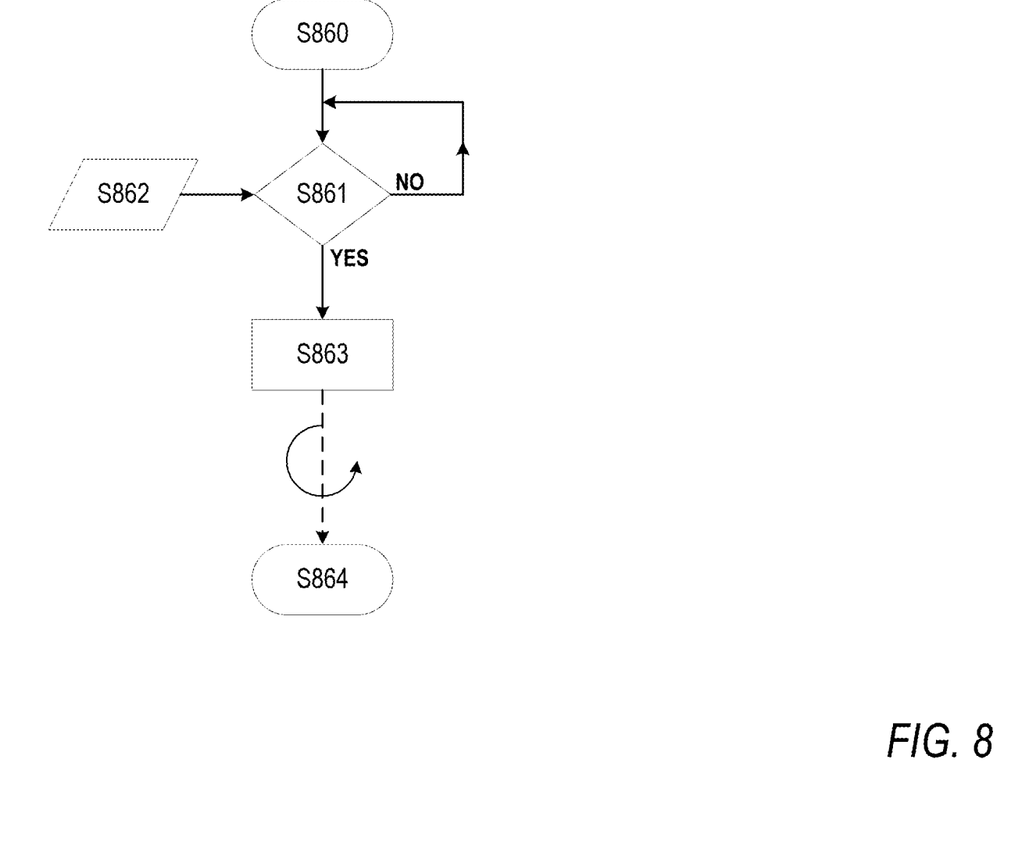
FIG. 8 is a flowchart describing an exemplary dispensation control scheme of a dispenser assembly, according to an embodiment of the present disclosure.

As described previously, the present disclosure describes a force-, or load-controlled embodiment of aspects of the dispenser assembly and dispenser assembly control device. FIG. 8, accordingly, is a flowchart describing the load-controlled dispensation control scheme of aspects of the dispenser assembly, according to an exemplary embodiment. In an example, following confirmation of contact with the piston, via the 'contact' sensor, phase two of a prescribed speed profile proceeds with the plunger traveling at a 'seal mass speed' into the canister S860. A continuous evaluation of the mass of the collection bottle is performed S861 via data received from the weighting tray S862 to determine if the seal of the canister is ruptured and contents of the canister have begun to flow into the collection bottle. If it is determined that the mass of the collection bottle has increased, and the seal has ruptured therein, the dispenser assembly control device moves to the next phase of the speed profile S863. Similarly, until the termination of dispensation, at which point the plunger is retracted S864 to the 'home' position, continuous evaluation of the mass of the collection bottle is performed to determine when the mass of the collection bottle reaches a target mass and the control scheme may proceed to a subsequent phase.

Alternatively, when a displacement-controlled dispenser assembly control device scheme is considered, progression of the speed profile is controlled by the known dimensions and parameters of the components of the dispenser assembly. In an example, at S860, a plunger is in phase one of a prescribed speed profile. Based on a known relationship between lead screw rotation and linear translation of a stage of a linear guide (i.e. carriage assembly), and the known dimensions of the plunger assembly and the canister, a defined travel distance of the carriage assembly can be prescribed in order to move the carriage assembly from a 'home' position to a 'contact' position. Concurrent with travel, an evaluation can be made via data received from the dispensing motor S862 to determine if the correct number of rotations, and linear travel therefrom, have been performed S861 in order to arrive at the 'contact' position. Once it has been determined that the correct number of rotations of the lead screw have been applied, the dispenser assembly control device may proceed to the next phase of the speed profile S863. Subsequent speed profile phases may be accomplished in the context of pre-determined component-derived values including but not limited to the internal volumetric dimensions of the canister and the dimensions of the canister output. As with a load-controlled control scheme, subsequent phases of a speed profile may progress in a similar manner, continuously evaluating the realized displacement in relation to a target displacement. Once a target displacement has been achieved, the dispenser assembly control device instructs the plunger to return to the 'home', or zero, position S864.

Figure 9:
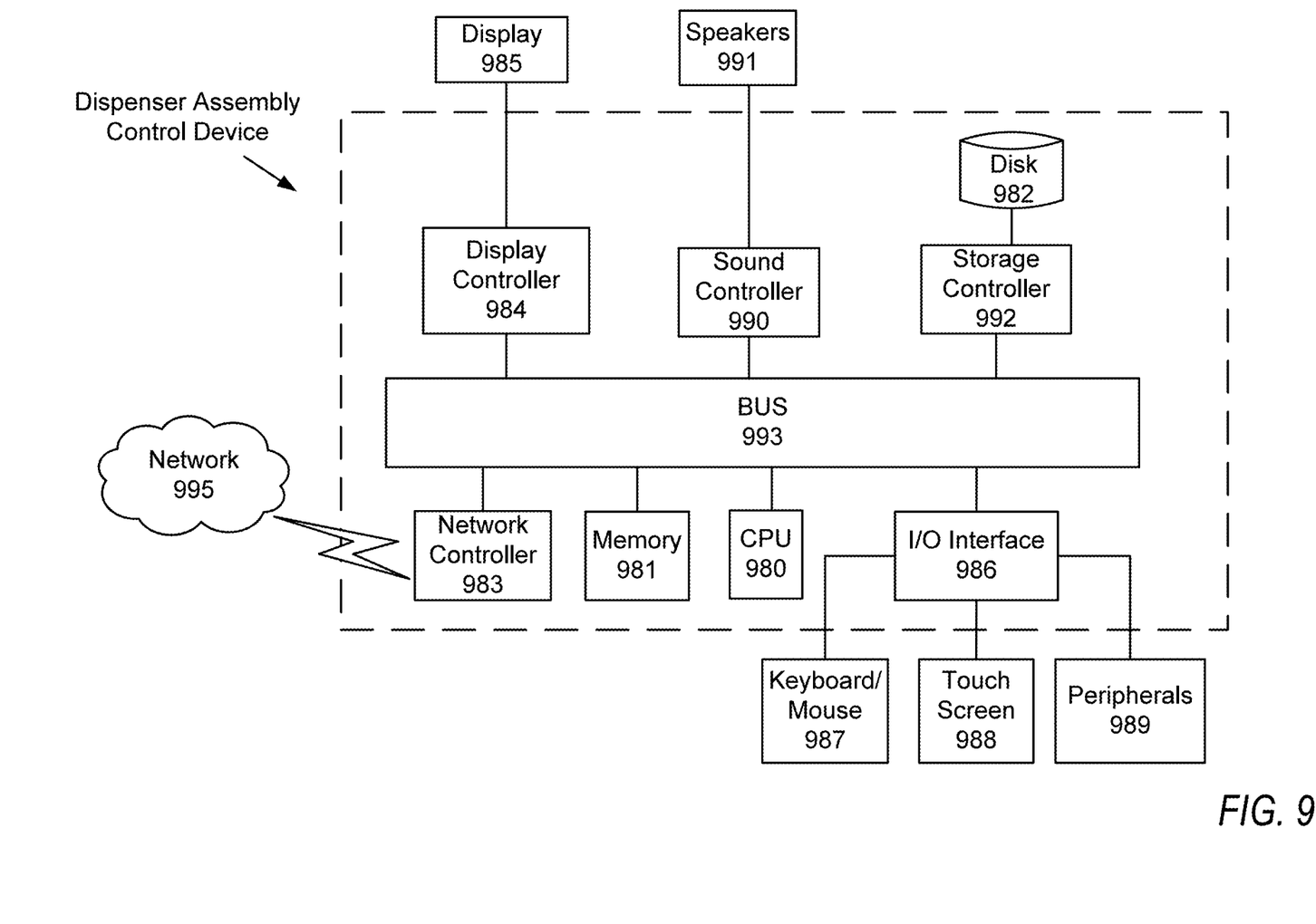
FIG. 9 is a hardware description of a dispenser assembly control device, according to an embodiment of the present disclosure.

Next, a hardware description of the dispenser assembly control device according to exemplary embodiments is described with reference to FIG. 9. In FIG. 9, the dispenser assembly control device includes a CPU 980 which per-forms the processes described above/below. The process data and instructions may be stored in memory 981. These processes and instructions may also be stored on a storage medium disk 982 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the dispenser assembly control device communicates, such as a server or computer.

According to an embodiment, the CPU 980 of the dispenser assembly control device is a component of a CPU 980 of the system for cosmetic formulation.

In an embodiment, the CPU 980 provides primary control over the separate circuitry components included in the system, such as the NFC Interface and the dispenser control circuitry (which includes an optics circuitry, a load cell circuitry, and a dispensing motor driver circuitry).

Further, the claimed advancements may be provided as a utility application, background daemon, or component of an operating system, or combination thereof, executing in conjunction with CPU 980 and an operating system such as Microsoft Windows 7, UNIX, Solaris, LINUX, Apple MAC-OS and other systems known to those skilled in the art.

The hardware elements in order to achieve the dispenser assembly control device may be realized by various circuitry elements, known to those skilled in the art. For example, CPU 980 may be a Xenon or Core processor from Intel of America or an Opteron processor from AMD of America, or may be other processor types that would be recognized by one of ordinary skill in the art. Alternatively, the CPU 980 may be implemented on an FPGA, ASIC, PLD or using discrete logic circuits, as one of ordinary skill in the art would recognize. Further, CPU 980 may be implemented as multiple processors cooperatively working in parallel to perform the instructions of the inventive processes described above.

The dispenser assembly control device in FIG. 9 also includes a network controller 983, such as an Intel Ethernet PRO network interface card from Intel Corporation of America, for interfacing with network 995. As can be appreciated, the network 995 can be a public network, such as the Internet, or a private network such as an LAN or WAN network, or any combination thereof and can also include PSTN or ISDN sub-networks. The network 995 can also be wired, such as an Ethernet network, or can be wireless such as a cellular network including EDGE, 3G and 4G wireless cellular systems. The wireless network can also be WiFi, Bluetooth, or any other wireless form of communication that is known.

The dispenser assembly control device further includes a display controller 984, such as a NVIDIA GeForce GTX or Quadro graphics adaptor from NVIDIA Corporation of America for interfacing with display 985, such as a Hewlett Packard HPL2445w LCD monitor. A general purpose I/O interface 986 interfaces with a keyboard and/or mouse 987 as well as a touch screen panel 988 on or separate from display 985. General purpose I/O interface also connects to a variety of peripherals 989 including printers and scanners, such as an OfficeJet or DeskJet from Hewlett Packard.

A sound controller 990 is also provided in the dispenser assembly control device, such as Sound Blaster X-Fi Titanium from Creative, to interface with speakers/microphone 991 thereby providing sounds and/or music.

The general purpose storage controller 992 connects the storage medium disk 982 with communication bus 993, which may be an ISA, EISA, VESA, PCI, or similar, for interconnecting all of the components of the dispenser assembly control device. A description of the general features and functionality of the display 985, keyboard and/or mouse 987, as well as the display controller 984, storage controller 992, network controller 983, sound controller 990, and general purpose I/O interface 986 is omitted herein for brevity as these features are known.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An apparatus for dispensing compounds for cosmetic formulations, comprising:
    a dispensing motor;
    a plunger assembly having a plunger; and
    a dispensing assembly control device having processing circuitry configured to:
        receive electrical feedback regarding a plurality of characteristics of the apparatus, and
        modify a movement of the plunger based upon the received electrical feedback regarding the plurality of characteristics of the apparatus, wherein
        the plurality of characteristics of the apparatus include a determined position of the plunger and a mass of a collection bottle.

2. The apparatus according to claim 1, wherein the dispensing assembly control device having the processing circuitry is further configured to:
    confirm a first position of the plunger based upon a position of a first photointerrupter flag relative to a light of a first optical sensor,
    translate the plunger at a first speed based upon the confirmation of the first position of the plunger,
    determine a second position of the plunger based upon a relative position of a second photointerrupter flag and a light of a second optical sensor,
    translate the plunger based upon the determination of the second position of the plunger at a second speed,
    compare a first mass of the collection bottle and a first target mass of the collection bottle,
    translate the plunger based upon the comparison of the first mass of the collection bottle and the first target mass of the collection bottle at a third speed,
    compare a second mass of the collection bottle and a second target mass of the collection bottle,
    translate the plunger based upon the comparison of the second mass of the collection bottle and the second target mass of the collection bottle at a fourth speed,
    compare a third mass of the collection bottle and a third target mass of the collection bottle, and translate the plunger based upon the comparison of the third mass of the collection bottle and the third target mass of the collection bottle at a fifth speed, wherein the plunger is configured to contact a surface of a canister.

3. The apparatus according to claim 2, wherein the first optical sensor is an optical-type photosensor.

4. The apparatus according to claim 2, wherein the second optical sensor is a reflector-type photosensor.

5. The apparatus according to claim 2, wherein the plunger assembly further comprises a carriage assembly having a bottom carriage and a top carriage and the second photointerrupter flag is disposed on a surface of the bottom carriage.

6. The apparatus according to claim 5, wherein, following contact between the plunger and the surface of the canister, an inter-carriage distance decreases, said inter-carriage distance being a distance between a top surface of the bottom carriage and a bottom surface of the top carriage.

7. The apparatus according to claim 6, wherein the second photointerrupter flag disposed on the surface of the bottom carriage, upon the decrease in the inter-carriage distance, reflects the light of the second optical sensor.

8. The apparatus according to claim 2, wherein the fourth speed is a variable speed, the variable speed being a derivative of a rate of acceleration over time between the second target mass and the third target mass.

9. The apparatus according to claim 2, wherein the processing circuitry is further configured to:

determine a third position of the plunger based upon a relative position of a third photointerrupter flag and a light of a third optical sensor; and translate the plunger based upon the determination of the third position of the plunger at a retraction speed.

10. The apparatus according to claim 2, wherein the processing circuitry is further configured to:

measure a current amperage of the dispensing motor;

compare the current amperage of the dispensing motor to an expected amperage of the dispensing motor; and translate the plunger based upon the comparison of the current amperage and the predicted amperage at a retraction speed.

* * * * *